United States Patent [19]

Shankman

[11] Patent Number: 5,286,289
[45] Date of Patent: Feb. 15, 1994

[54] COMBINATION IRON STAIN AND COATING FOR MASONRY CONCRETE AND LIKE MATERIAL AND METHOD OF FORMING THE SAME

[76] Inventor: David Shankman, 6732 SW. 71st Ct., Miami, Fla. 33143

[21] Appl. No.: 811,659

[22] Filed: Dec. 23, 1991

[51] Int. Cl.⁵ ............................................. C09K 3/00
[52] U.S. Cl. ................................. 106/34; 106/286.3
[58] Field of Search ............................. 106/34, 286.3

[56] References Cited
U.S. PATENT DOCUMENTS 4,775,416 10/1988 Bevege et al. ................ 106/286.3

*Primary Examiner*—David Brunsman
*Attorney, Agent, or Firm*—Malloy & Malloy

[57] ABSTRACT

An iron based stain and an iron coating both concurrently formed through the blending or mixture of predetermined amounts of iron particles with one of a variety of acidic solutions wherein the iron stain is defined by an acidic solution of iron oxide and the iron coating is defined by the collected, non-suspended iron particles in a slurry and/or paste-like state. The exposed surfaces of masonry, concrete, stone and like materials are thereby provided with an architecturally decorative appearance after application of either the iron stain or iron coating.

8 Claims, No Drawings

COMBINATION IRON STAIN AND COATING FOR MASONRY CONCRETE AND LIKE MATERIAL AND METHOD OF FORMING THE SAME

BACKGROUND OF THE INVENTION

1. Field of the Invention

The present invention relates to an iron stain composition and an iron coating composition, both of which are concurrently formed and independently utilized as a decorative, architectural application to masonry, concrete or like exposed surfaces.

2. Description of the Prior Art

The vast majority of decorative stains available and commercially known in the prior art and being of the type used on masonry, concrete and similar surfaces have been composed of pigments along with some type of applicable carrier base. For example, an antique effect is established on such surfaces by using suitable colors applied to simulate the qualities and/or overall aesthetic appearance desired. A variation of color tone may be accomplished from applications of pigmented washes. Such latter appearances are common throughout the Mediterranean regions of the world and are now widely imitated architectural coatings. In the aforementioned prior art stain applications, the colors most commonly employed are what is known as "earth tones" such as but not limited to terra cotta. Conventional paints and stains as conventionally applied provide a single tone or color over a masonry or like surface. In order to arrive at an antique or washed effect, numerous applications of various shaded and/or colored pigments are applied until the desired effect is attained. Therefore, as pointed out above, merely applying a given pigment, paint, etc., to an exposed masonry surface, does not provide the overall versatility of appearance or desired architectural coating which may be desired for certain applications.

For new concrete compositions, the use of an intrinsic color for cements is incorporated. However, in order to accomplish this, the mixing of color and the cleaning up of concrete mixers is necessary, along with considerable labor and expense.

In view of the above prior art development, there is still a need in the architectural industry for a decorative stain and/or coating composition which can be applied, using conventional, low-cost techniques to exposed masonry, concrete or like material surfaces in order to provide an aesthetic appearance to such surfaces which is remarkably effective at enhancing the appearance of such materials without the necessity of expensive and laborious pre-treatment, such as cleaning and restoration. In a preferred embodiment of the present invention to be described in greater detail hereinafter, a preferred architectural coating includes an iron-based composition thereby providing a natural patina to such indicated surfaces which is easier to maintain than other paints and/or existing prior art stains.

SUMMARY OF THE INVENTION

The present invention is directed to an iron-based stain and/or coating composition which can be applied to masonry, concrete and like material surfaces in order to greatly enhance the overall appearance and provide an aesthetically desirable architectural coating to said surfaces while eliminating high cost maintenance and providing the desired visual effect. Once applied, the iron stained finish on the surfaces is easier to maintain than if other prior art paints or stains were utilized because, the build-up of environmental soil only enhances the rustic quality of the "ironized" surfaces. However, standard concrete or pigmented finishes merely appear to be dirty. The natural patina employed is remarkably effective at enhancing old concrete sidewalks and buildings without expensive and laborious cleaning and restoration work being performed thereon. The staining properties of the iron stain or iron-based coating of the present invention are also permanent. Such stains and/or coatings do not wash, peel or leech off the applied surfaces.

The intended objects and advantages of utilizing the iron-based stain and/or coating of the present invention include the provision of an oxidized iron "patina" on masonry, concrete or like material surfaces, whether those surfaces be sidewalks, pavements, walls, etc. The application of the composition of the present invention thereby gives an antique iron quality through the simple application of the single iron stain product. The natural color variations produced upon drying of the subject compositions, independent of one another, on the intended surfaces provide an instant natural patina without any special artistic skill employed and thereby eliminates the necessity of hiring high-priced artisans or laborers for such applications.

In addition, the iron stain composition can be applied directly over old concrete sidewalks and building surfaces, which are uncoated, unsealed or unpainted, including stucco or pre-cast panels, which may require only a simple sweeping, vacuuming or other type of cleaning of accumulated debris or free dirt from the surface preceding the iron staining application. Because the iron stain is in a water base, iron particle mixture, absorption into the concrete, or like material surface, is not obstructed by weathered or soiled surfaces as long as the surface is reasonably sound.

The texture of concrete masonry surface may further enhance the effectiveness of the iron stain and/or iron coating, extenuating the texture with color variations of the iron oxide patina instead of the unicolor coverage for the application of existing paints and stains.

Other advantages of the iron stain of the subject invention is that it does not serve as a surface coating or film which can be removed, after a predetermined period of time, due to wear such as by peeling off. To the contrary, the iron stain of the present invention in effect penetrates the surface or impregnates such masonry/concrete surface as it is absorbed.

The iron coating of the subject invention is an iron oxide paste-like material which bonds with itself and the masonry, concrete or like material surface to provide, in effect, a bonded iron surface coating. The iron paste is composed of iron powder maintained or formed in a fixed slurry after removal of suspended iron particles in acidic solution therefrom, the latter of which defines the iron stain portion of the formed composition.

DETAILED DESCRIPTION OF THE PREFERRED EMBODIMENT

In a preferred embodiment of the present invention, both the iron stain and the iron coating are concurrently formed by applying a predetermined amount of clean water to the interior of a mixing container. The mixing container is formed of a high strength material which is generally resistent to harmful reaction by an acidic solution. An acidic solution of predetermined concentration is added to the clean water and subsequently a predetermined amount or percentage by weight of iron particles are added to the diluted acidic solution previously combined within the mixing container.

An oxidation reaction occurs between the acidic solution and the iron particles. Experiments dictate that utilization of finer or smaller size particles of iron allows more surface area thereof to be exposed to the acidic solution for reaction with available hydronium ions of the acidic solution. The reaction may proceed more completely and at a faster rate with particles having a progressively smaller size.

Upon beginning of the oxidation reaction, the ph of the solution rises gradually indicating the rate of oxidation. While the ph of the solution generally begins below 0.5, after addition of iron particles, the ph rises at a rate consistent with the strength of the acidic solution and the relative amount of iron particles applied (as well as very possibly the size of particles utilized as set forth above).

Also, mixing, particularly continuous mixing, for a predetermined time serves to increase the rate of oxidation reaction between the acidic solution and the iron particles. The mixing and/or increase in the rate of oxidation reaction is allowed to continue until the desired ph level for application to a predetermined surface has been reached. For iron stain and iron coating compositions, it is preferred that a desired ph level be between 3.0 and 6.0, although ph levels outside this range are acceptable under certain conditions.

The ph level of the given solution can be measured by a conventional ph meter and the continuous and/or periodic mixing may be accomplished either by a hand manipulated stirrer or motorized mixing blades or like motorized equipment.

Other factors affecting the formation of the subject composition include the strength of the acidic solutions which preferably are either hydrochloric acid solutions or sulfuric acid solutions. Any standard iron particles can be utilized although particle size may be varied. Conventional and commercially available iron particles include iron powders known as atomized iron or sponge iron wherein the sponge iron is noted to be more porous than the aforementioned atomized iron.

EXAMPLE I

In one example in the formation of the present invention, a clean volume of water in the amount of twenty-five gallons was added to a clean plastic container of sufficient volume. A forty percent concentrated solution of sulfuric acid was added to the water while the ph level thereof was simultaneously measured. The sulfuric acid was added until the ph level of the resulting mixture reached 0.1. This amounted to substantially 2.5 gallons of forty percent sulfuric acid solution. Next, twenty-five pounds of iron particles or more specifically sponge iron powder were added. Thereafter, the combined mixture was periodically mixed over a period of time while the ph level of the resulting mixture was monitored. The iron stain was ready for application and removed from the container once the ph level of the combined mixture reached 3.5. The iron stain had a greenish tint but was substantially transparent upon removal and application.

It should be noted that the ph level would have continued to rise beyond 3.5 if the combined mixture was allowed to stand for additional periods.

It has been found through additional experimentation that continuous mixing, as with a mechanical or motorized mixer, would have caused the ph level to rise at a faster rate than when periodic mixing was accomplished or if no manual or mechanical mixing were done.

The iron coating, defined by the iron particles left within the container and not maintained in liquid suspension were separated from the iron stain upon removal of the liquid phase of the mixture. Such iron coating had a slurry or paste-like consistency.

EXAMPLE II

Twenty-five gallons of clean water were added to a plastic container of suitable volume. A thirty percent acidic solution of hydrochloric acid was added continuously while the ph level of the resulting mixture was being measured. The hydrochloric acid was added until the ph level was 0.7. Next, twenty-five pounds of sponge iron powder was added. It was found, by measurement, that substantially 2.5 gallons of hydrochloric acid was added. The resulting mixture was allowed to sit, with periodic mixing occurring, and periodic measurement of the ph level obtained until the ph level reached 4.2. At this time, the iron stain or liquid phase of the mixture was separated from the iron coating by removing the liquid phase from the container. The iron coating may be defined by the iron particles not maintained in liquid suspension but collected at the bottom of the container in a slurry or paste-like consistency.

The iron stain appears clear with a slightly brown to black tint. It can be applied to the masonry or concrete surfaces by any means, including brush, roller, spray facilities, etc. A pump-type sprayer can be utilized to spray successive applications of the iron stain without resulting in "lap marks" which would obviously detract from the overall aesthetic appearance. The general and recognized coverage of iron stain is from approximately 80 to 300 square feet per gallon applied in one to four coats depending upon the density and absorption rate of the surface being treated.

EXAMPLE III

Twenty-five gallons of clean water was added to a plastic container of sufficient volume. A thirty percent solution of hydrochloric acid was added to the water while the ph level of the combined mixture was continuously monitored. Once the ph level reached 0.7, the adding of the hydrochloric acid was stopped. It was determined that substantially 2.5 gallons of hydrochloric acid was added to the twenty-five gallons of water. Next, twenty-five pounds of atomized iron powder was added to the above set forth mixture and the entire mixture was allowed to stand with periodic mixing applied. The ph level of the combined mixture was periodically monitored and the iron stain was removed from the iron coating or collected particles within the bottom of the container once the ph level reached 5.5. The solution appears clear with a black tint.

With regards to the iron coating, such can be utilized wherever an oxidized iron surface is desired as an architectural or sculptural embellishment. Such iron coating of the present invention is easily applied over a concrete, stone or like material or structure which can be constructed or poured with a more economical use of labor and materials than custom metal castings. The oxidized or "rusted" iron finish of the iron coating is more stable than rusted steel in that it does not "scale" or "flake" as is found in iron or steel castings left outside and being exposed to the elements. Again, application of the iron coating can be applied by any applicable means to the desired exposed surface. A preferred coating would have a common thickness of substantially one-sixteenth inch to one-quarter inch spread substantially consistently over the entire exposed surface. The iron coating will bond to smooth surfaces, however, it should be realized that texturized surfaces are preferable in that more surface area is available in which to create a bond between the surface being treated and the iron coating.

Again with regard to the iron stain portion of the subject composition, it has become evident, through experimentation, that the oxidation reaction may proceed faster with the use of a stronger or higher concentration of acidic solution. Therefore, a variance of the type, strength and concentration of acidic solution may be taken into consideration for various factors, such as speed of production, price of relative commercial grade acids and the price of containers, safety equipment and ventilators.

It will be noted in the above set forth examples that one pound of iron particles was used consistently in the creation of the iron stain and coating. However, additional experimentation indicates that, depending upon the results desired, the range of iron particles may vary substantially between one-half pound to five pounds of iron particles for every gallon of water initially added to a mixing container. One result in adding additional amounts of iron particles then that indicated above would be a resulting greater quantity of coating being usable after removal of the iron stain solution.

Obviously, other factors than acidic concentration may vary the rate of reaction. Such other factors include higher concentration of iron particles since more iron with a sufficient concentration of acid would bring the solution to a higher ph (reduced acidity) within a shorter period of time, in a fixed volume of solution.

Now that the invention has been described,
What is claimed is:

1. A method of forming an iron stain and iron coating for exposed surfaces of cementitious material, said method comprising the steps of:
  a) placing a first volume of clean water in a container formed of a high strength material substantially nonreactive to acid,
  b) adding a second volume of acidic solution in the amount sufficient to bring the ph level to substantially 1.0 or less,
  c) monitoring the ph level of the first volume and the second volume beginning substantially when the second volume is added to the first volume,
  d) adding one pound of iron particles for every gallon of the first volume of water in the resulting mixture,
  e) mixing the first and the second volumes and the iron particles at least periodically, while monitoring the ph level thereof until an oxidation reaction between the iron particles and the diluted acid solution results in a ph level in a range of between about 3.0 and 6.0,
  f) removing the resultant liquid phase comprising an iron oxide solution from the container prior to application thereof to a surface to define the iron stain,
  g) collecting the remainder of the non-suspended iron particles to define the iron coating,
  h) said second volume of the acidic solution being a sulfuric acid solution.

2. The method as set forth in claim 1 wherein the acidic solution has a concentration prior to adding it to the first volume of substantially between thirty percent and forty percent.

3. The method as set forth in claim 1 comprising measuring the ph level of the acidic solution and iron particle mixture until the ph level is between 3.0 and 6.5.

4. The method as set forth in claim 3 wherein said ph level is substantially 3.5.

5. A method as in claim 1 comprising varying the amount of iron particles added to the first and second volumes between the ranges of 0.5 pounds and 5 pounds per gallon of the first volume of water.

6. A method as in claim 1 comprising increasing the rate of the oxidation reaction and decreasing the time until the combined mixture reaches said predetermined ph level by continuously mixing the combined first volume, second volume and iron particles.

7. A method as in claim 1 wherein said iron particles comprise a sponge iron powder.

8. A method as in claim 1 wherein the iron particles comprise an atomized iron powder.

* * * * *